United States Patent
Lin

(10) Patent No.: US 9,625,658 B1
(45) Date of Patent: Apr. 18, 2017

(54) COMMUNICATION CONNECTOR WITH ALTERABLE POLARITY

(71) Applicant: JYH ENG TECHNOLOGY CO., LTD., New Taipei (TW)

(72) Inventor: Yen-Lin Lin, New Taipei (TW)

(73) Assignee: JYH ENG TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 15/096,282

(22) Filed: Apr. 12, 2016

(51) Int. Cl.
*G02B 6/38* (2006.01)

(52) U.S. Cl.
CPC .......... *G02B 6/387* (2013.01); *G02B 6/3826* (2013.01); *G02B 6/3871* (2013.01); *G02B 6/3878* (2013.01); *G02B 6/3893* (2013.01)

(58) Field of Classification Search
CPC .... G02B 6/387; G02B 6/3826; G02B 6/3871; G02B 6/3878; G02B 6/3893
USPC ............................................ 385/85–88, 147
See application file for complete search history.

(56) References Cited

U.S. PATENT DOCUMENTS

| | | | |
|---|---|---|---|
| 7,712,970 B1 | 5/2010 | Lee | |
| 8,152,385 B2 | 4/2012 | de Jong et al. | |
| 8,491,199 B1 * | 7/2013 | Dang | G02B 6/3821 |
| | | | 385/84 |
| 8,678,669 B2 | 3/2014 | Lee | |
| 8,727,638 B2 | 5/2014 | Lee et al. | |
| 8,834,038 B2 | 9/2014 | Limbert et al. | |
| 9,213,151 B2 * | 12/2015 | Lin | G02B 6/3895 |
| 2010/0310222 A1 * | 12/2010 | Zhou | G02B 6/4466 |
| | | | 385/135 |

* cited by examiner

*Primary Examiner* — Akm Enayet Ullah
(74) *Attorney, Agent, or Firm* — Leong C. Lei

(57) ABSTRACT

A communication connector with alterable polarity, comprising a main body, a pair of fiber optic plugs, and a casing for signal connection via a fiber optic socket, wherein the pair of fiber optic plugs are installed at the front end of the main body, and the casing provides a sliding cover around the main body. A clip is positioned on the casing. The front end of the clip is used for fixing on the fiber optic socket. Moreover, a pair of grabs is positioned on the surface of the casing corresponding to a neck of the main body. The two grabs are pressed at the same time and separated from the two necks, and the main body and the casing are separated, rotated 180 degrees with regard to each other, and reassembled. So, the wire jumper polarity exchange is performed by substantially improving convenience and efficacy during operation.

9 Claims, 9 Drawing Sheets ously. In the conventional technique, separable upper and lower covers are used, and an embedded structure is present in between the covers. While changing the connection heads of the two sides, it is only required to separate the upper and lower covers and swap the two connection heads found on the left and right sides.
COMMUNICATION CONNECTOR WITH ALTERABLE POLARITY

FIELD OF THE INVENTION

The present invention relates to the field of communication connectors, and particularly relates to a communication connector structure with alterable polarity providing easy polarity exchange operation and substantially promoting ease of operation.

DESCRIPTION OF THE RELATED ART

In the conventional network communication technology, copper wires are used as signal transmission media, but various points must to be taken into consideration for transmission in copper wires, such as: 1. Transmission distance: Since the transmission signals of copper wires carry electric signals, they are restricted with the diameter and own resistance of the copper wires. As the transmission distance gets longer, the signals are weakened more clearly and poor signal problems occur; 2. Background noise of transmission: Since usually network lines that are formed of pair twisted 8 core wires are used in copper wires, while they carry electric signals for transmission through a network, they are disturbed by electromagnetic effect and thus background noise occurs. Especially, during high frequency signal transmission, this background noise would increase and affect the transmission bandwidth. For the past few years, in order to increase the network signal transmission speed, fiber optic networks are developed. The fiber optic networks have the following advantages: 1. Transmission speed of light signals is higher than electric signals; 2. Attenuation of light signals is lower than electric signals; and 3. Fiber optic transmission distance is higher than the transmission distance obtained with copper wires. As a result, fiber optic networks are gradually becoming the main communication networks. However, there are differences between using fiber optics as transmission media and using common copper wires. Both ends of copper wires individually have a signal transmitter-receiver, so that a single copper wire can perform the task of conveying signals in both ways. On the other hand, fiber optic wires are used for transmitting signals in long distances. Therefore, the light transmitted by fiber optic wires is laser, which has higher energy, and which is not able to use transmitters and receivers together. As a result, when transmitting signals via fiber optics, the transmission has to be made in pairs, or in other words, one side should transmit and the other side should receive, which forms the polarity of fiber optic transmission systems.

Accordingly, fiber optic transmissions are commonly made in pairs, and thus the designs of communication connectors are in the form of duplex communication connectors formed by combining two connection heads. However, they are restricted by the polarity problem. Close attention must be paid during connection, otherwise the fiber optic transmitter or receiver might be damaged due to inverse connection. For this reason, when it is discovered that the fiber optic polarity is connected wrongly, the two sides of the connection has to be exchanged/altered quickly. In the conventional technique, separable upper and lower covers are used, and an embedded structure is present in between the covers. While changing the connection heads of the two sides, it is only required to separate the upper and lower covers and swap the two connection heads found on the left and right sides.

U.S. Pat. No. 7,712,970, entitled: "Detachable fiber optic connector" discloses two fiber optic plugs that become a single piece body by means of combining an upper and a lower cover. Also, the two sides of the upper and lower covers separately have structures for fastening with each other. With this technique, while performing changing operation, special attention must be paid in order not to lose the upper and lower covers. Since the machine rooms are small and operators are big compared to the compact workspace, this kind of separable designs should be handled with special care.

Other documents are the U.S. Pat. No. 8,152,385, entitled: "Duplex fiber optic assemblies suitable for polarity reversal and methods therefore", the U.S. Pat. No. 8,678,669, entitled: "Reconfigurable polarity detachable connector assembly", and the U.S. Pat. No. 8,727,638, entitled: "Fiber channel-inter changeable fiber optic connector", which all use upper and lower shells for clamping and fastening two fiber optic plugs. The upper and lower shells are covered and contained by a sliding cover. While adjusting polarity, the sliding cover is opened and the upper and lower shells present a loose state. At the same time, the axes of the two fiber optic plugs are rotated 180 degrees, and then the sliding cover is pushed and fastened back on the upper and lower shells. In this way, the polarity adjustment work is completed. However, this design has a deficiency. While changing the polarities, the fiber optic plug can be rotated together with the fiber optic wire, causing the fiber optic wire to be shortened or extended due to twisting, and this might cause the re-assembled position to be wrong or the fiber optic wire to get damaged easily.

In another US Patent document with U.S. Pat. No. 8,834,038, entitled: "Fiber optic connector", it is disclosed that, after the fiber optic plugs without clips are covered by a casing, a clip structure is positioned on the casing, and the clip structure comprises two grabs extending towards the fiber optic plug direction, so that the two grabs and a fiber optic socket can be fastened with each other. When fiber optic polarity is to be changed, it is only required to pull up the clip structure and change its position to the other side of the casing. This structure presents the most simple and easy structure compared to the above given other patent documents. However, since the whole body is turned over, there might be a twisting problem. While turning over, the entire fiber optic wire can be evenly distributed, in terms of damage, it can be turned over alone, or exchange twist could be very small. However, since the structure is simple, when the clip structure is pulled out, it can face the problem of flying out, or under construction environment, it may be lost.

All of the above described various prior art communication connectors perform structural alteration via conventional communication connector structures. The communication connectors that are already installed in the past cannot have universality. Besides, changing all of these communication connectors would also be a time consuming and troublesome effort. It also has similar inconvenience from the point of computer room construction personnel. As a result, improvement is required in the related technical field.

SUMMARY OF THE INVENTION

In light of the above given problems, a purpose of the present invention is to provide a communication connector with alterable polarity, which has sliding fastening relationship between a main body and a casing in order to stabilize the two fiber optic plugs found at the front end of the main body. Also, a clip is positioned on top of the casing in order to ensure fastening and fixing on a fiber optic socket. Moreover, a pair of grabs is positioned on the surface of the casing at positions corresponding to the main body, and by means of pressing the two grabs at the same time, the casing and the main body can be separated from each other. After the main body and the casing are rotated 180 degrees with regard to each other, they are re-assembled with each other, and thus the wire jumper polarity exchange application is performed in a manner that substantially improves convenience and efficacy during operation.

In order to achieve the above said purposes, the communication connector with alterable polarity according to the present invention ensures signal connection by providing a fiber optic socket with two jacks, comprising: a main body, which has a fiber optic cable inserted through its rear end, and two outlet ends positioned at its other end such that they would correspond to the fiber optic cable, so that two fiber optic wires of the fiber optic cable would individually go through and exit from the two outlet ends; a pair of fiber optic plugs, which are individually fixed into the two outlet ends, such that each fiber optic wire would pass through and be fixed in each fiber optic plug, so that the two fiber optic plugs individually become the two corresponding different polarities of the fiber optic transmission system; and a casing, which has a containing space corresponding to the main body for placement of the main body into an assembly position in the containing space of the casing, a clip, positioned on top of the casing, and when the communication connector is inserted into the fiber optic socket, by means of the clip, the casing, together with the main body, can be engaged and fixed to the corresponding jack found in the fiber optic socket; and during adjustment, the two grabs are pressed at the same time and thus the two necks present a separating appearance, and then the main body can be separated from the inner part of the casing and present a separate state, and after the main body and the casing are rotated 180 degrees with regard to each other, the main body is brought back and fixed to its assembled position again, and thus the polarity exchange purpose is achieved.

In another embodiment, a guide block and a neck are positioned individually at the two sides of the outer walls at the rear end of the main body, such that the necks are found at one side of the guide block. Also, at the two sides of the casing, a guide groove and a grab are also found, corresponding to the two guide blocks. After restricting and guiding the direction of the main body with the guide blocks, it is engaged into the two necks using the pair of grabs.

In another embodiment, a bump is found at the outer wall of each outlet end, and each of the fiber optic plugs have a channel corresponding to these bumps, so that each fiber optic plug would be fixed at each outlet end. Also, the clip is formed integrally and positioned above the rear end of the casing, such that the clip has a form that is curved upward and extending forward with regard to the casing. Also, the front end of the clip comprises two buckles, forming the shape of a fork. The tips of both of the buckles comprise two blocking points that extend horizontally outward from both sides. By means of these two blocking points, engaging and fixing can be achieved into the jacks of the fiber optic socket.

Or, a pivot joint is positioned above the rear end of the casing in order to pin-joint the clip at the pivot joint, such that the clip would present a form that is curved upward and extending forward with regard to the casing, and the front end of the clip comprises two buckles, forming the shape of a fork, and the tips of both of the buckles comprise two blocking points that extend horizontally outward from both sides, and by means of these two blocking points, engaging and fixing can be achieved into the jacks of the fiber optic socket. Moreover, a jack-up piece is positioned at the casing, below the clip, in order to ensure that the clip is provided with the required recovery height during use. Or, an elastic element is positioned between the lower part of the clip and the casing in order to ensure that the clip is provided with the required recovery elasticity during use.

In another embodiment, the communication connector with alterable polarity according to the present invention also comprises a release lever, and the release lever extends from the other end of the clip, so that the release lever presents a downward and backward curved and extending pattern with regard to the casing. Moreover, a raising piece is positioned below the release lever, and the raising piece is positioned between the pivot joint and the fiber optic cable in order to raise the release lever and move the front end of the clip downward. In addition, the tip of the release lever has a curved surface that is raised upward in order to allow insertion of the operator's finger, so that the operator's finger can be inserted between the curved surface and the fiber optic cable, so that the two buckles found at the front end of the clip can be released from the jacks of the fiber optic socket. Also, the upward raise angle of the curved surface is between 10 to 35 degrees.

DETAILED DESCRIPTION OF THE PREFERRED EMBODIMENTS

Figure 1:
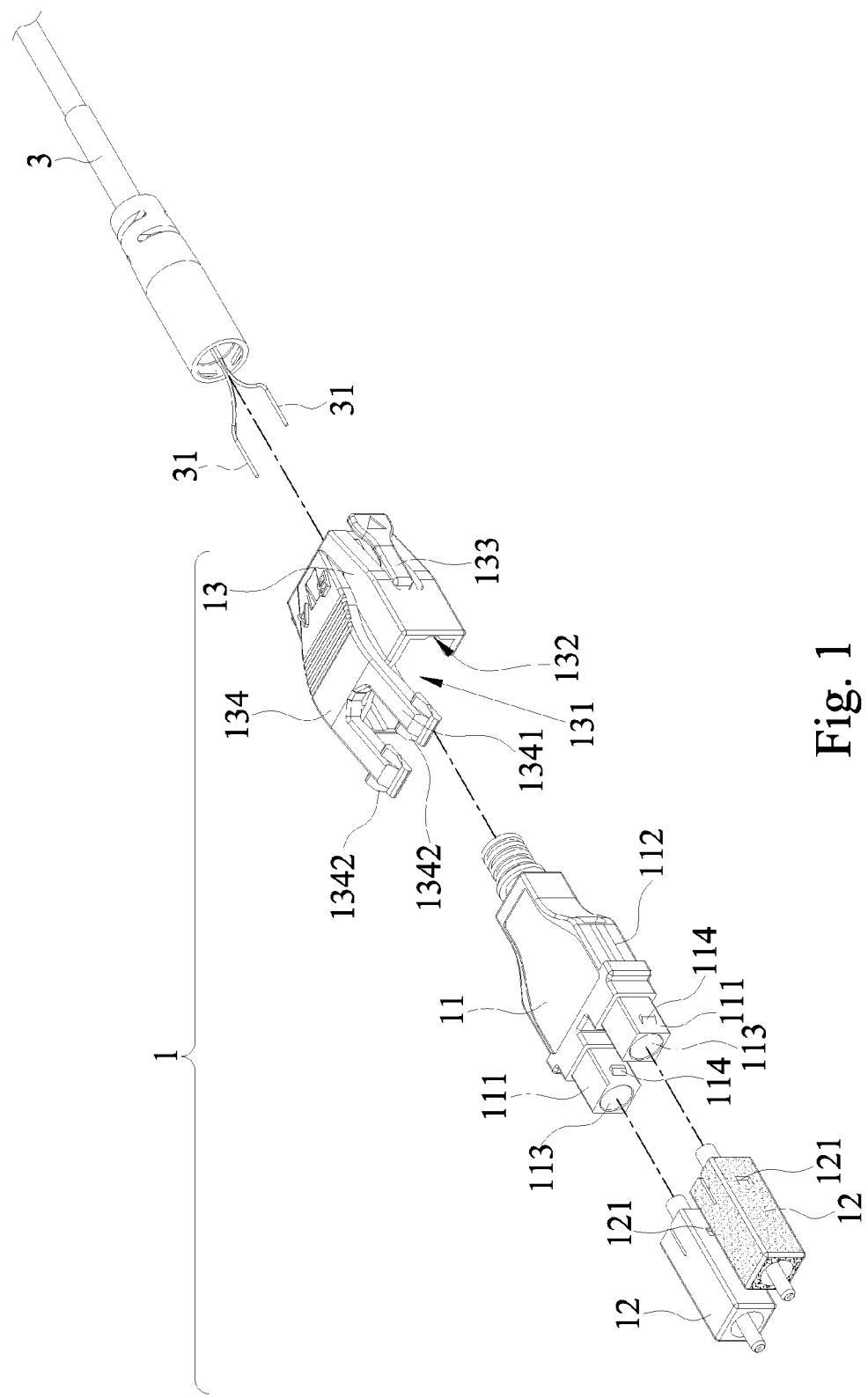
FIG. 1 is a three dimensional exploded view of a preferred embodiment of the present invention.
Figure 2:
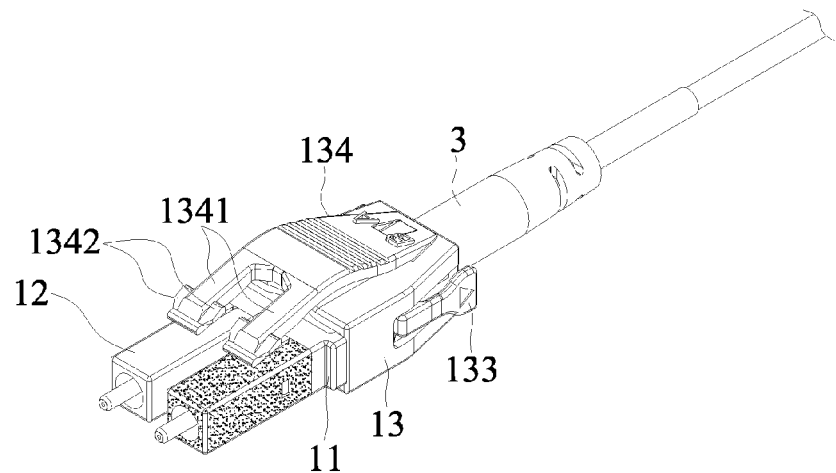
FIG. 2 is a three dimensional exterior view of the mounted-state of a preferred embodiment of the present invention.
Figure 3:
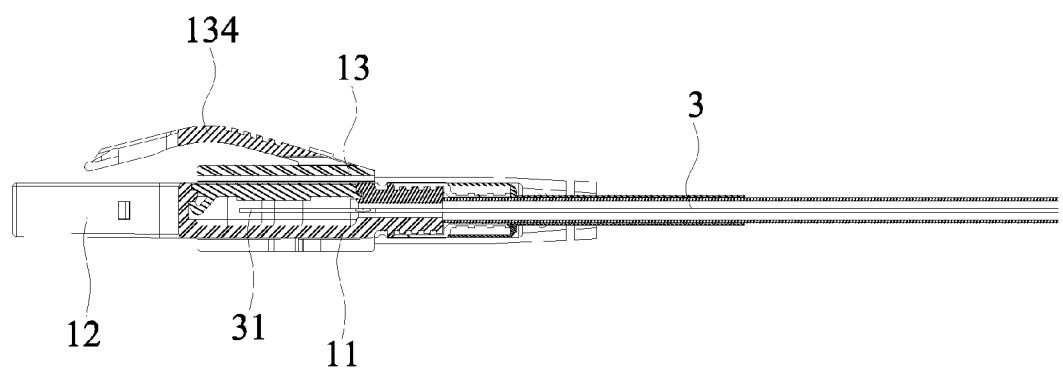
FIG. 3 is a sectional view of the mounted-state of a preferred embodiment of the present invention.

Below given detailed description and relevant figures are provided for making the content of the present invention clear for the esteemed examination expert.

In FIGS. 1-6, the three dimensional exploded view and the three dimensional mounted external view of preferred embodiments of the present invention, and schematic views of different states such as while being inserted into a fiber optic socket and while changing polarity are given. As shown in the figures, the communication connector with alterable polarity 1 comprises a main body 11, a pair of fiber optic plugs 12, and a casing 13 in order to be connected to a fiber optic socket 2 and ensure signal connection.

Among these, a fiber optic cable 3 is inserted through the rear end of the main body 11, while at the other end, two outlet ends 111 are positioned such that they would correspond to the fiber optic cable 3, so that the two fiber optic wires 31 of the fiber optic cable 3 would individually go through the two outlet ends 111. A guide block 112 each is positioned at the two sides of the main body 11 rear end outer walls. It should be noted that, a locating slot 113 is found at each outlet end 111 at a position that would correspond to a fiber optic plug. Also, a neck 115 is positioned individually at the two side outer walls of the main body 11, such that the two necks 115 are individually located at each side of the guide blocks 112 (here, at the rear part of the figures).

Each fiber optic plug 12 is individually fixed into a locating slot 113 of the two outlet ends 111, such that each fiber optic wire 31 would pass through and be fixed in each fiber optic plug 12, so that the two fiber optic plugs 12 individually become the two corresponding different polarities of the fiber optic transmission system. Among these, a bump 114 is found at the outer wall of each outlet end 111, and each of the fiber optic plugs 12 have a channel 121 corresponding to these bumps 114, so that each fiber optic plug 12 would be fixed at each outlet end 111.

Figure 4:
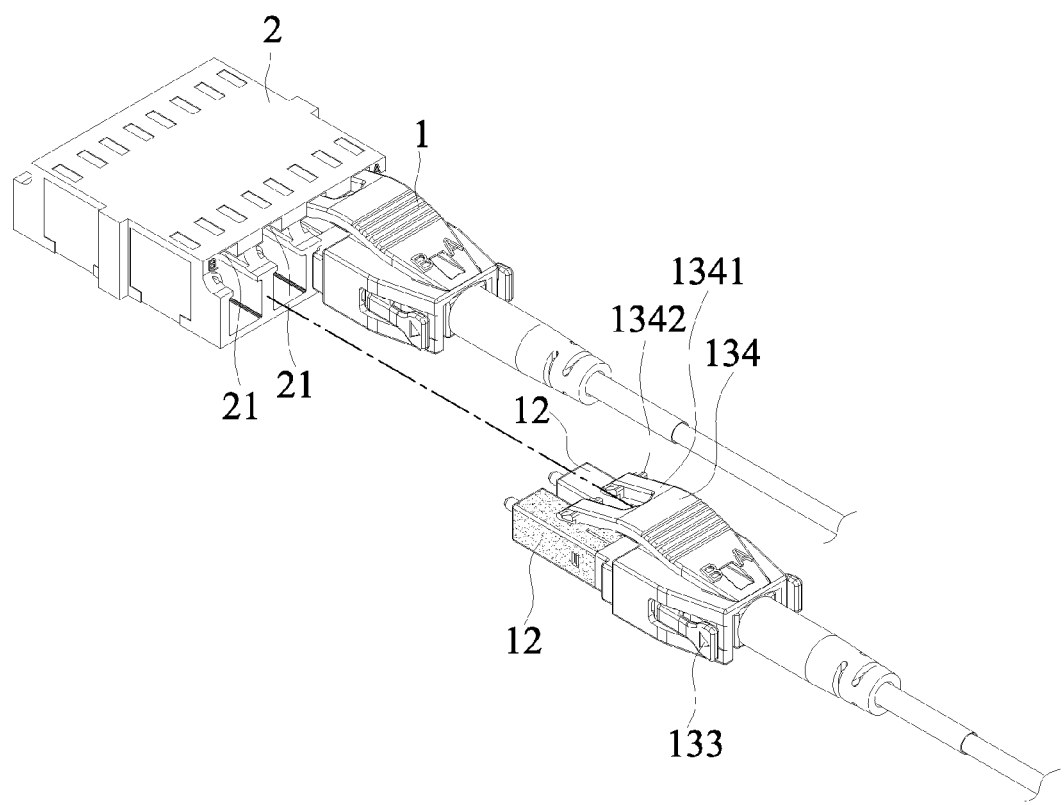
FIG. 4 is a schematic view of a preferred embodiment of the present invention that is inserted into a fiber optic socket.

A containing space 131 is found inside the casing 13, and the shapes of the containing space 131 and the main body 11 correspond to each other, so that the containing space can accommodate the main body 11. Also, at the two sides of the casing 13, a guide groove 132 and a grab 133 individually corresponding to the two guide blocks 112 are found. The two guide grooves 132 individually correspond to the two guide blocks 112 so that they can easily restrict and guide the casing 13 in accordance with the movement direction of the main body 11. Moreover, each one of the grabs 133 is found at one side of each guide groove 132 (at the other side with regard to the outlet end 111) in order to fit into the neck 115, so that they would perform the task of separating the casing 13 from the main body 11 via a backward movement or the task of a fixing means by combining the casing 13 with the main body 11 via a forward movement, in which the way of operation is as follows: The two grabs 133 are individually engaged into the two necks 115, so that the main body 11 is fixed into the casing 13, and otherwise it is released. A clip 134 is positioned on top of the casing 13. It should be noted that, the clip 134 is formed integrally and positioned above the rear end of the casing 13, such that the clip 134 has a form that is curved upward and extending forward with regard to the casing 13. As shown in FIG. 4, when the communication connector 1 is inserted into the fiber optic socket 2, by means of the clip 134, the casing 13, together with the main body 11, can be engaged and fixed to the corresponding jack 21 found in the fiber optic socket 2. Also, the front end of the clip 134 comprises two buckles 1341, forming the shape of a fork. The tips of both of the buckles 1341 comprise two blocking points 1342 that extend horizontally outward from both sides 13. By means of these two blocking points 1342, engaging and fixing can be achieved into the jacks 21 of the fiber optic socket 2.

Figure 5:
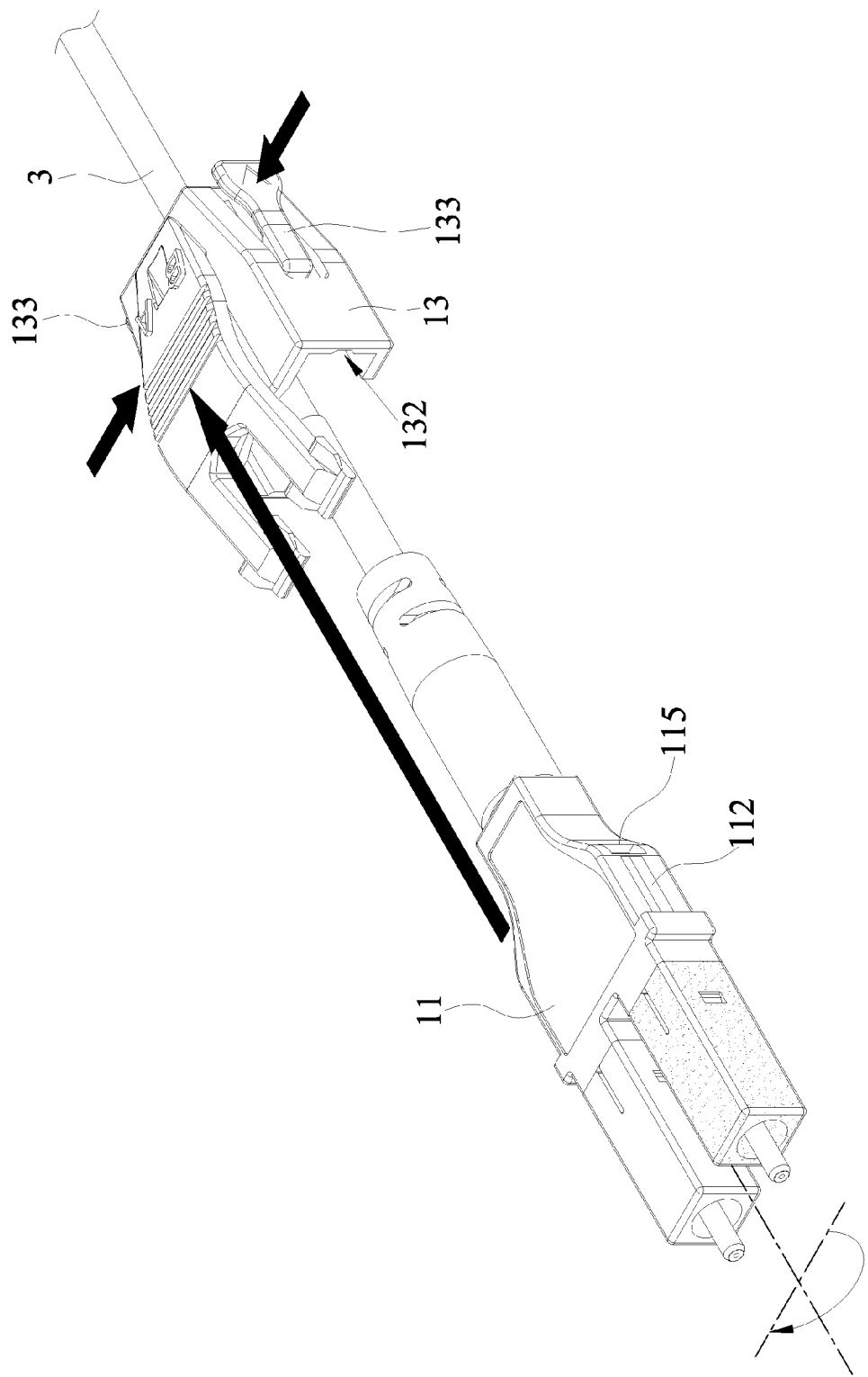
FIG. 5 is a schematic view of a preferred embodiment of the present invention, during changing polarity (I).
Figure 6:
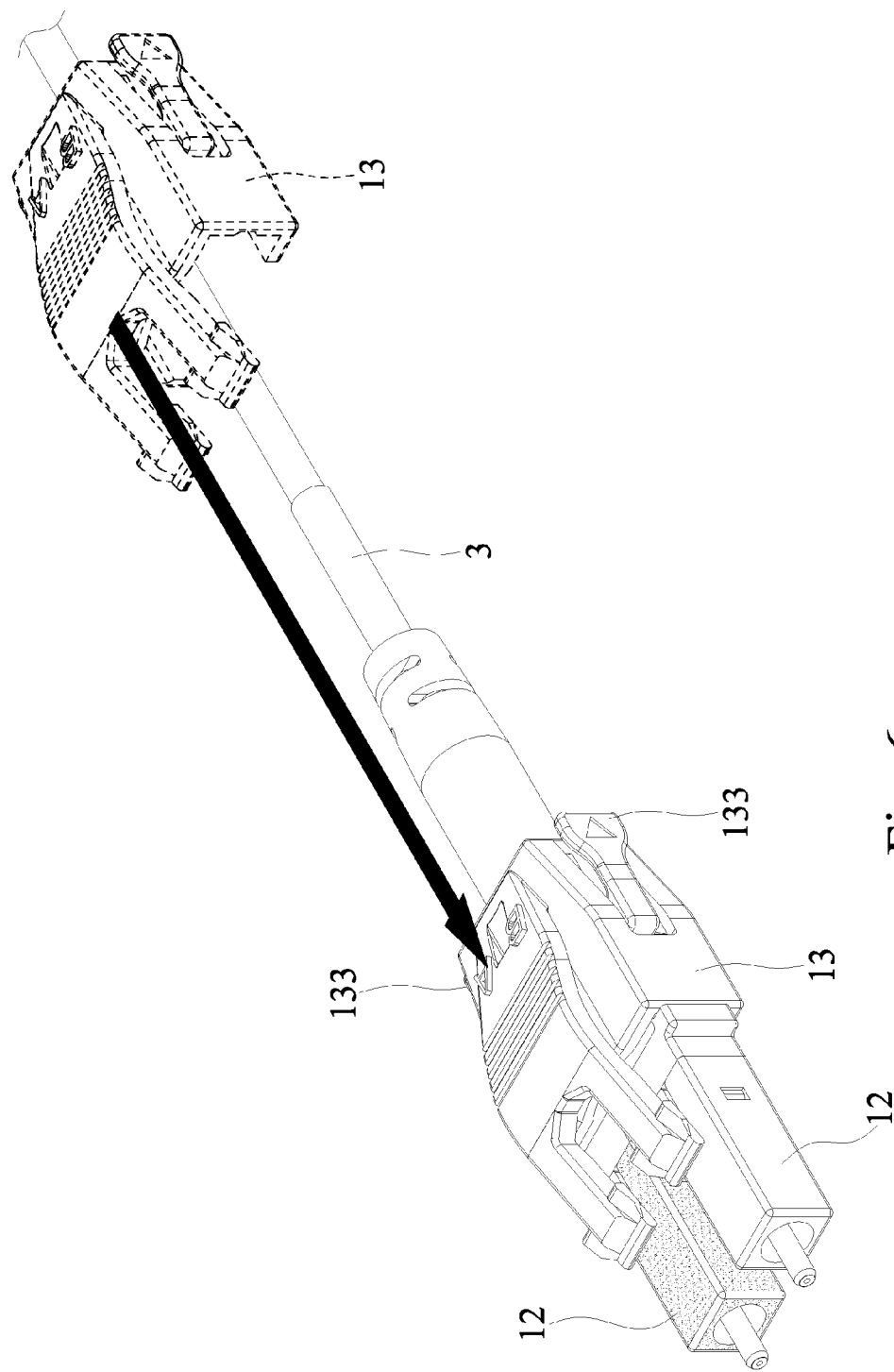
FIG. 6 is a schematic view of a preferred embodiment of the present invention, during changing polarity (II).

As shown in FIGS. 5 and 6, when polarity adjustment (commonly known as jumper wire) is to be made on the communication connector 1 of the present invention, the operator can press on the rear ends of the two grabs 133 at the same time in order to separate the rear ends from the two guide blocks 112, and make a releasing movement for the casing 13, and also slide the main body 11 backward relatively so that the main body 11 and the casing 13 would be released from each other. And then the main body 11 or the casing 12 is rotated 180 degrees, and the casing 13 is placed back on the main body 11 via sliding movement into its original fixed position, so that the polarity exchange/alteration work is quickly performed. This kind of design both prevents the problem of losing components during adjustment, and at the same time, prevents the fiber optic cable 3 from being damaged due to excessive twisting, and substantially promotes operating efficiency and efficacy, and ease of use.

Figure 7:
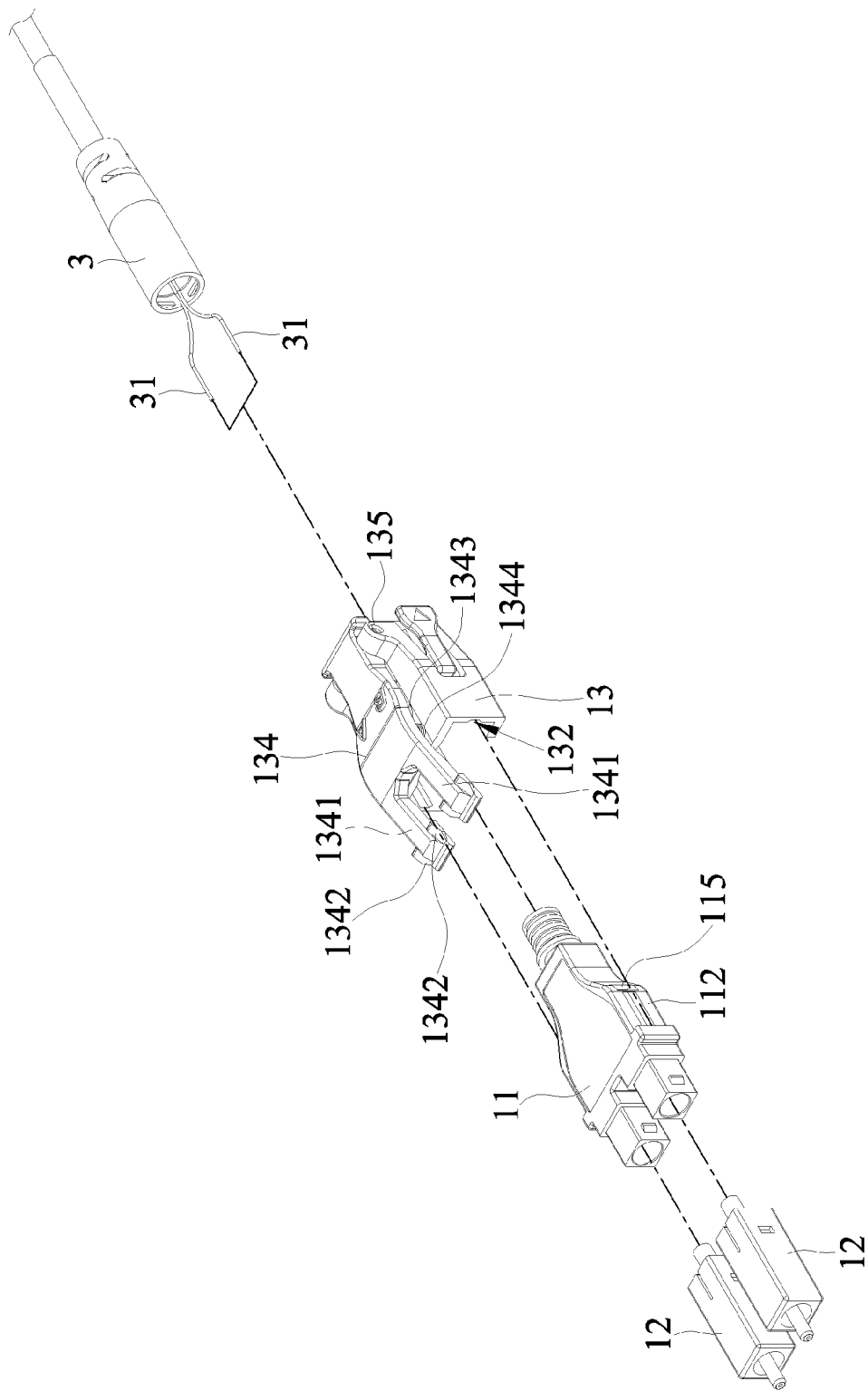
FIG. 7 shows another way of implementation of the casing of a preferred embodiment of the present invention.

According to FIG. 7, another way of implementation of the casing of a preferred embodiment of the present invention is given. As shown in the figure, a pivot joint 135 is positioned above the rear end of the casing 13 of the present invention in order to pin-joint the clip 134 at the pivot joint 135, such that the clip 134 would present a form that is curved upward and extending forward with regard to the casing 13. Also, the front end of the clip 134 similarly comprises two buckles 1341, forming the shape of a fork. The tips of both of the buckles 1341 comprise two blocking points 1342 that extend horizontally outward from both sides. As a result, these two blocking points 1342 can be used to perform engaging and fixing into the jacks 21 of the fiber optic socket 2. Moreover, in order to provide the clip 134 with more recovery and flexibility characteristics that are required during use, the present invention comprises a jack-up piece 1343 or an elastic element 1344 at a position corresponding to the casing 13 below the clip 134, so that while using the clip 134, it ensures that the clip can return back to its original high position after use. In this way, its fixation at the jack 21 can be ensured, and its stability after being fixed can be guaranteed.

Figure 8:
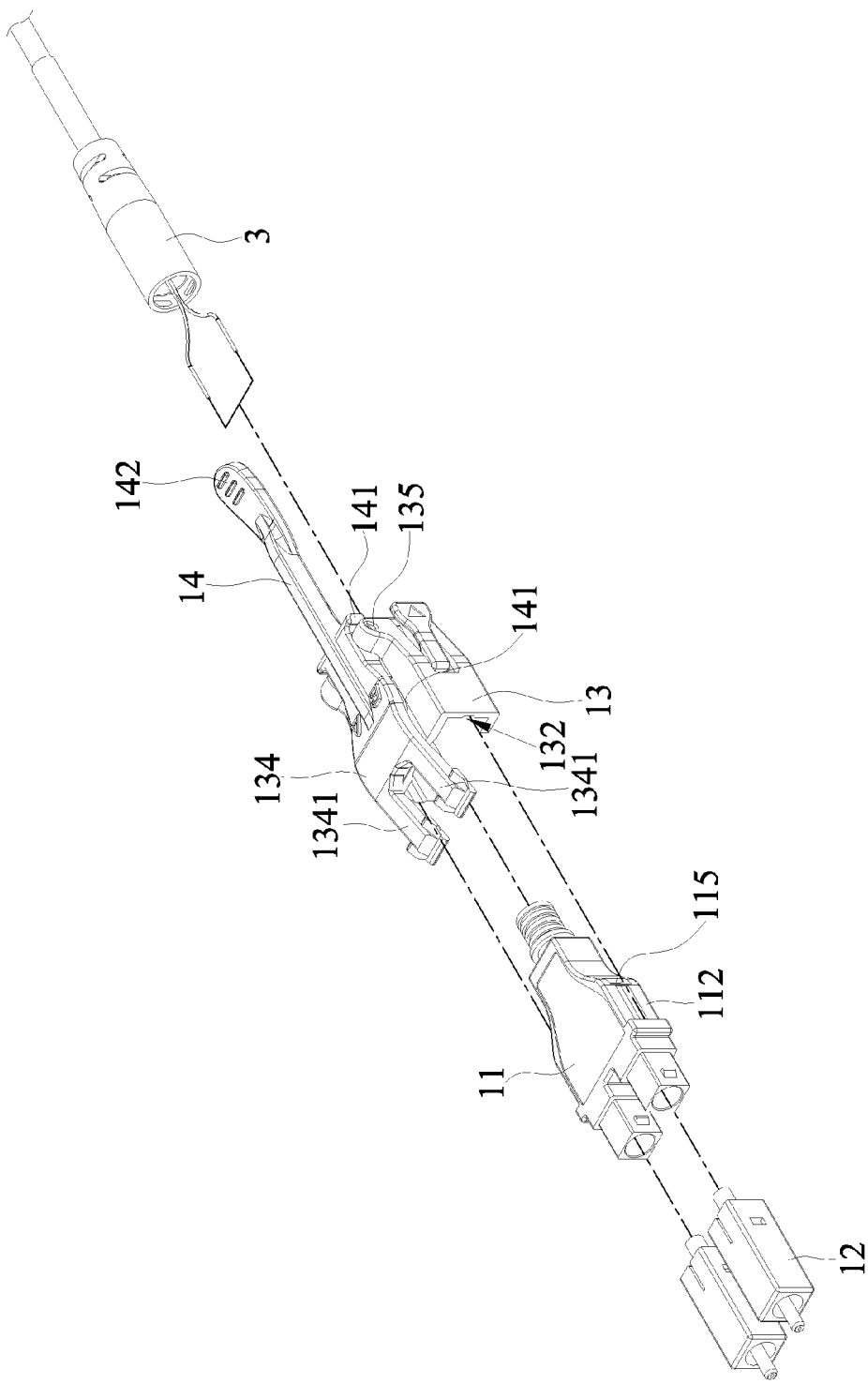
FIG. 8 is a schematic view of another preferred embodiment structure of the present invention.
Figure 9:
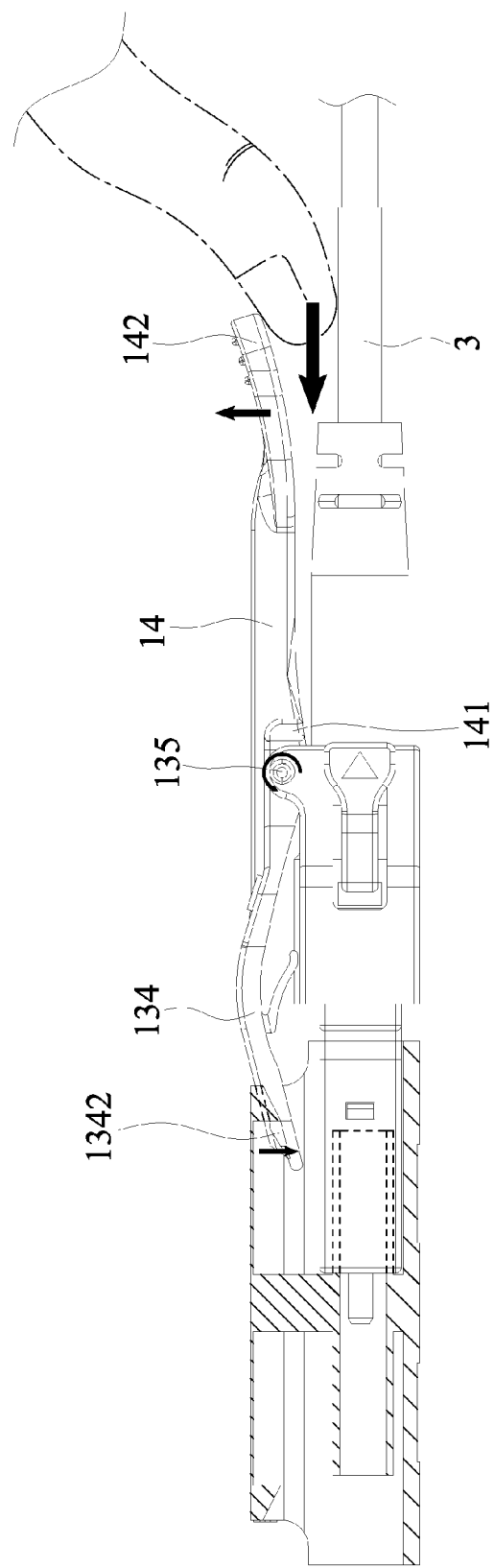
FIG. 9 is a schematic view of another preferred embodiment of the present invention, during insertion into a fiber optic socket.
Figure 10:
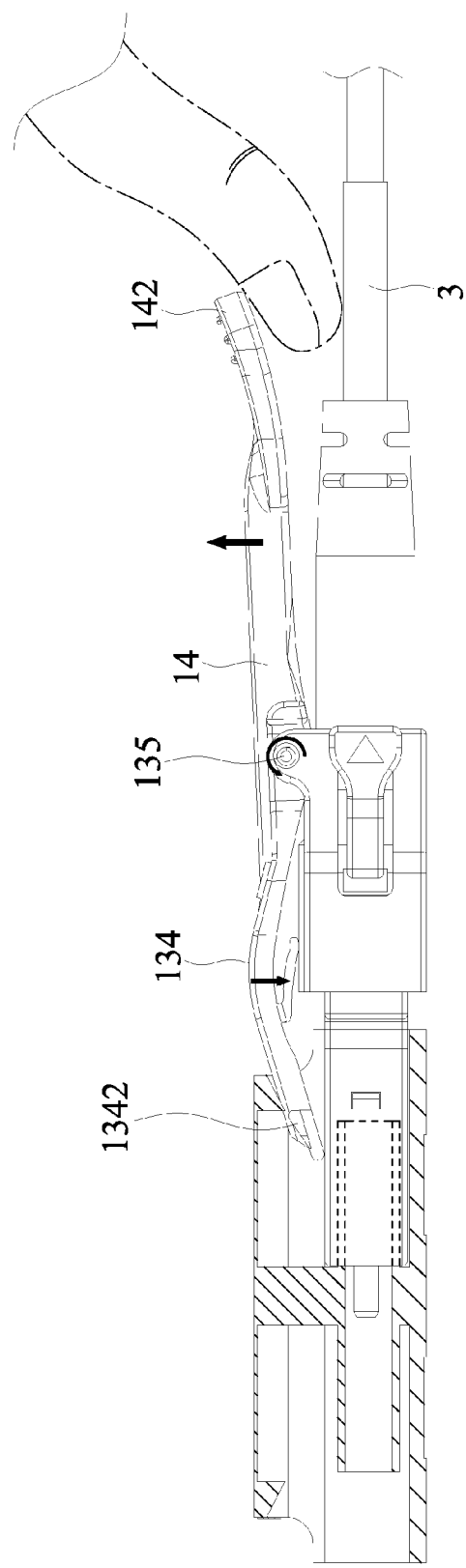
FIG. 10 is a schematic view of another preferred embodiment of the present invention, during pulling out from a fiber optic socket.

FIGS. 8, 9, and 10 are the schematic views of other preferred embodiment structures of the present invention, and the schematic views of their situations of being inserted into and pulled out from a fiber optic socket. As shown in the figures, in another embodiment of the present invention, the structure is substantially similar with the previous embodiment, and as the biggest difference, a release lever 14 is integrated as extending from the other end of the clip 134, and it is used with a hinge/joint motion similar to the previous embodiment. Moreover, the release lever 14 presents a downward and backward curved and extending pattern with regard to the casing 13, and its length reaches the position of the fiber optic cable 3. Besides, a raising piece 141 is positioned below the release lever 14. The raising piece 141 is positioned between the pivot joint 135 and the fiber optic cable 3 in order to raise the release lever 14 and move the front end of the clip 134 downward. In addition, the tip of the release lever 14 has a curved surface 142 that is raised upward in order to allow insertion of the operator's finger, so that the operator's finger can be inserted between the curved surface 142 and the fiber optic cable 3, and thus the two buckles 1341 found at the front end of the clip 134 can be released from the jacks 21 of the fiber optic socket 2. It should be noted that, as a result of practical tests, the optimal upward raise angle of the curved surface 142 is determined to be between 10 to 35 degrees. Degrees that are higher or lower than these determined values would easily cause inconvenience for the operator.

What is claimed is:

1. A communication connector with alterable polarity which ensures signal connection by providing a fiber optic socket with two jacks, comprising:
   a main body, which has a fiber optic cable inserted through its rear end, and two outlet ends positioned at its other end, such that they would correspond to the fiber optic cable, so that two fiber optic wires of the fiber optic cable would individually go through and exit from the two outlet ends;

a pair of fiber optic plugs, which are individually fixed into the two outlet ends, such that each fiber optic wire would pass through and be fixed in each fiber optic plug, so that the two fiber optic plugs individually become the two corresponding different polarities of the fiber optic transmission system; and a casing, which has a containing space corresponding to the main body for placement of the main body into an assembly position in the containing space of the casing, and a clip is positioned on top of the casing, and when the communication connector is inserted into the fiber optic socket, by means of the clip, the casing, together with the main body, can be engaged and fixed to the corresponding jack found in the fiber optic socket; and during adjustment, the main body can be separated from the inner part of the casing and present a separate state, and after the main body and the casing are rotated 180 degrees with regard to each other, the casing is brought back and fixed to its assembled position, and combined with the main body again.

2. The communication connector with alterable polarity according to claim 1, wherein the clip is formed integrally and positioned above the rear end of the casing, such that the clip has a form that is curved upward and extending forward with regard to the casing, and the front end of the clip comprises two buckles, forming the shape of a fork, and the tips of both of the buckles comprise two blocking points that extend horizontally outward from both sides, and by means of these two blocking points, engaging and fixing can be achieved into the jacks of the fiber optic socket.

3. The communication connector with alterable polarity according to claim 1, wherein a pivot joint is positioned above the rear end of the casing in order to pin joint the clip at the pivot joint, such that the clip would present a form that is curved upward and extending forward with regard to the casing, and the front end of the clip comprises two buckles, forming the shape of a fork, and the tips of both of the buckles comprise two blocking points that extend horizontally outward from both sides, and by means of these two blocking points, engaging and fixing can be achieved into the jacks of the fiber optic socket.

4. The communication connector with alterable polarity according to claim 1, wherein a jack-up piece is positioned at the casing, below the clip, in order to ensure that the clip is provided with the required recovery height during use.

5. The communication connector with alterable polarity according to claim 1, wherein an elastic element is positioned between the lower part of the clip and the casing in order to ensure that the clip is provided with the required recovery elasticity during use.

6. A communication connector with alterable polarity which ensures signal connection by providing a fiber optic socket with two jacks, comprising:

a main body, which has a fiber optic cable inserted through its rear end, and two outlet ends positioned at its other end such that they would correspond to the fiber optic cable, so that two fiber optic wires of the fiber optic cable would individually go through and exit from the two outlet ends; a guide block and a neck are positioned individually at the two sides of the main body rear end outer wall, and the neck is found at one side of the guide block;

a pair of fiber optic plugs, which are individually fixed into the two outlet ends, such that each fiber optic wire would pass through and be fixed in each fiber optic plug, so that the two fiber optic plugs individually become the two corresponding different polarities of the fiber optic transmission system;

a casing, which has a containing space corresponding to the main body, and a guide groove and a grab positioned at the two sides of the casing individually corresponding to the two guide blocks in order to restrict and guide the direction of the main body with the guide blocks, and then engage into the two necks using the pair of grabs, and thus place the main body into an assembly position in the containing space of the casing, and a clip is positioned on top of the casing, and when the communication connector is inserted into the fiber optic socket, by means of the clip, the casing, together with the main body, can be engaged and fixed to the corresponding jack found in the fiber optic socket; and a release lever, extending from the other end of the clip, and the release lever presenting a downward and backward curved and extending pattern with regard to the casing; and during adjustment, the main body can be separated from the inner part of the casing and present a separate state, and after the main body and the casing are rotated 180 degrees with regard to each other, the casing is brought back and fixed to its assembled position, and combined with the main body again.

7. The communication connector with alterable polarity according to claim 6, wherein a raising piece is positioned below the release lever, and the raising piece is positioned between the pivot joint and the fiber optic cable in order to raise the release lever and move the front end of the clip downward.

8. The communication connector with alterable polarity according to claim 7, wherein the tip of the release lever has a curved surface that is raised upward in order to allow insertion of the operator's finger, so that the operator's finger can be inserted between the curved surface and the fiber optic cable, so that the two buckles found at the front end of the clip can be released from the jacks of the fiber optic socket.

9. The communication connector with alterable polarity according to claim 8, wherein the upward raise angle of the curved surface is between 10 to 35 degrees.

* * * * *